US008601159B2

(12) United States Patent
Brown et al.

(10) Patent No.: US 8,601,159 B2
(45) Date of Patent: Dec. 3, 2013

(54) DISTRIBUTING AND ARBITRATING MEDIA ACCESS CONTROL ADDRESSES ON ETHERNET NETWORK

(75) Inventors: Taylor O. Brown, Bellevue, WA (US); Jeffrey Kinsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1328 days.

(21) Appl. No.: 11/235,871

(22) Filed: Sep. 27, 2005

(65) Prior Publication Data

US 2007/0073882 A1    Mar. 29, 2007

(51) Int. Cl.
*G06F 15/16* (2006.01)
*G06F 15/177* (2006.01)
*G06F 15/173* (2006.01)
*G06F 9/46* (2006.01)
*H04L 29/12* (2006.01)
*H04L 29/08* (2006.01)
*H04L 29/06* (2006.01)
*G06F 9/50* (2006.01)

(52) U.S. Cl.
CPC ...... *H04L 29/12066* (2013.01); *H04L 29/0872* (2013.01); *H04L 29/06* (2013.01); *G06F 9/5011* (2013.01)
USPC ........... 709/245; 709/203; 709/220; 709/221; 709/222; 718/100; 718/104

(58) Field of Classification Search
USPC .............. 709/245, 203, 220–229; 718/1, 100, 718/104
See application file for complete search history.

(56) References Cited

U.S. PATENT DOCUMENTS 5,724,510 A * 3/1998 Arndt et al. .................... 709/220
5,835,725 A * 11/1998 Chiang et al. ................. 709/228
(Continued)

OTHER PUBLICATIONS

R. Droms: Dynamic Host Configuration Protocol, RFC 2131, 1997 http://tools.ietf.org/html/rfc2131.*

(Continued)

*Primary Examiner* — Catherine Thiaw
(74) *Attorney, Agent, or Firm* — Woodcock Washburn, LLC

(57) ABSTRACT

Unique Media Access Control (MAC) addresses are determined for dynamically addressable synthetic and physical network devices by requesting a MAC address anonymously from a server acting as an address allocator and arbiter, confirming the use of the requested MAC address, and relinquishing the address to the server for reuse when the MAC address is no longer needed. Alternatively, an agent with a known or established MAC address may be used to request a unique MAC address for the device from the server and to inform the server when the device no longer requires the requested MAC address. Also, instead of requesting a MAC address from a server acting as an address allocator and arbiter, the device instead may send a broadcast Ethernet packet with a broadcast source address having a payload indicating an intent to use a specific MAC address. If another device receiving this broadcast is already using the specific MAC address, then a broadcast packet is sent indicating a conflict with the device's intended address. In this case, the original device would send a new broadcast Ethernet packet with a payload indicating an intent to use a different specific MAC address. This process repeats until no response or assertion of use of the specific address in the payload is received by the original device. These techniques assure that dynamically addressable synthetic devices (such as virtual machines) and physical network devices do not attempt to use the same MAC address on the same network link.

15 Claims, 13 Drawing Sheets

(56) References Cited

U.S. PATENT DOCUMENTS

| | | | | |
|---|---|---|---|---|
| 6,061,739 | A * | 5/2000 | Reed et al. | 709/245 |
| 6,928,478 | B1 * | 8/2005 | Gangadharan | 709/226 |
| 6,982,953 | B1 * | 1/2006 | Swales | 370/218 |
| 7,085,838 | B2 * | 8/2006 | Jones et al. | 709/227 |
| 7,440,415 | B2 * | 10/2008 | Wild et al. | 370/254 |
| 7,478,173 | B1 * | 1/2009 | Delco | 709/250 |
| 7,515,589 | B2 * | 4/2009 | Bacher et al. | 370/392 |
| 7,656,788 | B2 * | 2/2010 | Ma et al. | 370/219 |
| 7,689,723 | B1 * | 3/2010 | DiMambro | 709/250 |
| 7,706,310 | B2 * | 4/2010 | Peng | 370/310 |
| 2002/0073182 | A1 * | 6/2002 | Zakurdaev et al. | 709/220 |
| 2002/0120720 | A1 * | 8/2002 | Moir | 709/220 |
| 2003/0041151 | A1 * | 2/2003 | Senapati et al. | 709/229 |
| 2003/0084165 | A1 * | 5/2003 | Kjellberg et al. | 709/227 |
| 2003/0088700 | A1 * | 5/2003 | Aiken | 709/245 |
| 2003/0172155 | A1 * | 9/2003 | Kim | 709/224 |
| 2004/0015966 | A1 * | 1/2004 | MacChiano et al. | 718/1 |
| 2004/0049586 | A1 * | 3/2004 | Ocepek et al. | 709/229 |
| 2004/0064559 | A1 * | 4/2004 | Kupst et al. | 709/226 |
| 2005/0027851 | A1 * | 2/2005 | McKeown et al. | 709/224 |
| 2005/0027883 | A1 * | 2/2005 | Carrier | 709/245 |
| 2005/0114515 | A1 * | 5/2005 | Droms | 709/227 |
| 2006/0075103 | A1 * | 4/2006 | Cromer et al. | 709/225 |
| 2006/0233168 | A1 * | 10/2006 | Lewites et al. | 370/389 |
| 2007/0027973 | A1 * | 2/2007 | Stein et al. | 709/223 |

OTHER PUBLICATIONS

Gratuitous ARP, retrieved from http://wiki.wikishark.org/gratuitous_ARP.*

Sanai: 'Detection or promiscuous nodes using ARP packets' version 1.0, Aug. 31, 2001.*

Fujisawa, 2000, DHCP for IEEE 1394, RFC 2855, Network Working Group.*

* cited by examiner

DISTRIBUTING AND ARBITRATING MEDIA ACCESS CONTROL ADDRESSES ON ETHERNET NETWORK

FIELD OF THE INVENTION

The invention is directed to systems and methods for generating unique Media Access Control (MAC) addresses across physical networks so as to prevent the use of duplicate MAC addresses for communications on the same network segment and, more particularly, the invention is directed to a system and method of allocating unique MAC addresses and managing the use of the unique MAC addresses for all dynamic virtual and physical addressing network devices on a network segment.

BACKGROUND OF THE INVENTION

Network devices require unique Media Access Control (MAC) addresses in order to communicate across physical or virtual networks. Traditionally, MAC addresses are assigned by the manufacture of the device from a pool of unique addresses that the manufacture acquires from the IEEE regulatory body. The assigned MAC addresses then are typically hardwired into the device. The MAC address may comprise six octets of address where the first three octets are assigned by the IEEE and the last three octets are assigned by the owner of the device. However, synthetic network devices, such as those found in Virtual Machines (VMs), and dynamic addressing physical devices have MAC addresses that may change or may be dynamically assigned or reassigned and then used or reused. Such devices on the same network segment may cause duplicate addresses to be exposed on the same network segment, thereby impeding network connectivity of both devices. In order to prevent duplications, a system or method must be implemented to arbitrate the use of a MAC address on a given network. Conventionally, when a duplicate dynamic MAC address is detected, the instantiating addresses are changed. On the other hand, virtual machine products such as Microsoft Virtual Server™ can query devices on its physical box to determine if a MAC address is in use. Unfortunately, existing products such as Microsoft Virtual Server™ and Microsoft Virtual PC™ do not adequately solve this MAC addressing problem by, for example, permitting queries across multiple machines and allow machines with duplicate MAC addresses to attempt to communicate on the same network segment.

A technique is desired that, for example, allows a central arbitrator to allocate and manage the MAC addresses for all dynamic addressing network devices on the network so as to ensure uniqueness or that allows devices to prevent other devices from using their MAC addresses. For network security and reliability, a system is desired that will provide and arbitrate the use of unique MAC addresses across physical networks and across product lines and manufacturers, even when synthetic network devices and/or dynamic addressing physical devices are used on the network. The present invention is designed to address these needs in the art.

SUMMARY OF THE INVENTION

The invention addresses the above-mentioned needs in the art by enabling a device to determine its unique Media Access Control (MAC) address by requesting a MAC address anonymously from a server and confirming the use of the requested MAC address. When the MAC address is no longer needed, it is relinquished to the server for reuse. In an alternative embodiment, the device may use an agent to request a unique MAC address for the device from a server and to inform the server when the device no longer requires the requested MAC address.

In another embodiment of the invention, instead of requesting a MAC address from a server, a device may send a broadcast Ethernet packet with a predetermined source address having a payload indicating an intent to use a specific MAC address. If another device receiving this broadcast is already using the specific MAC address, then a broadcast packet is sent out indicating that the address is in use. In this case, the original device would send a new broadcast Ethernet packet with a payload indicating an intent to use a different specific MAC address. This process repeats until no response or assertion of use of the specific address in the payload is received by the original device.

The invention includes devices, methods and computer readable media containing software that when read by a general purpose computer reconstitutes the general purpose computer into a device in accordance with the invention. These and other characteristics of the invention will be apparent to those skilled in the art based on the following detailed description.

BRIEF DESCRIPTION OF THE DRAWINGS

The systems and methods for distributing and arbitrating MAC addresses on an Ethernet network in accordance with the invention are further described with reference to the accompanying drawings, in which.

DETAILED DESCRIPTION OF ILLUSTRATIVE EMBODIMENTS

The subject matter of the present invention is described with specificity with respect to FIGS. 1-13 to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described as being significant to operation of the invention.

Overview

The invention provides a system and method for enabling dynamically addressable synthetic and physical network devices to determine their unique Media Access Control (MAC) addresses by requesting a MAC address anonymously from a server, confirming the use of the requested MAC address, and relinquishing the address to the server for reuse when the MAC address is no longer needed. Alternatively, an agent may be used to request a unique MAC address for the device from the server and to inform the server when the device no longer requires the requested MAC address. Also, instead of requesting a MAC address from a server, the device instead may send a broadcast Ethernet packet with a predetermined source address having a payload indicating an intent to use a specific MAC address. If another device receiving this broadcast is already using the specific MAC address, then a broadcast packet is sent out indicating that the address is in use. In this case, the original device would send a new broadcast Ethernet packet with a payload indicating an intent to use a different specific MAC address. This process repeats until no response or assertion of use of the specific address in the payload is received by the original device. These techniques assure that different devices do not attempt to use the same MAC address on the same network link.

Distributing and Arbitrating MAC Addresses on Ethernet Network

The techniques of the invention will be described below with respect to FIGS. 1-13.

Figure 1:
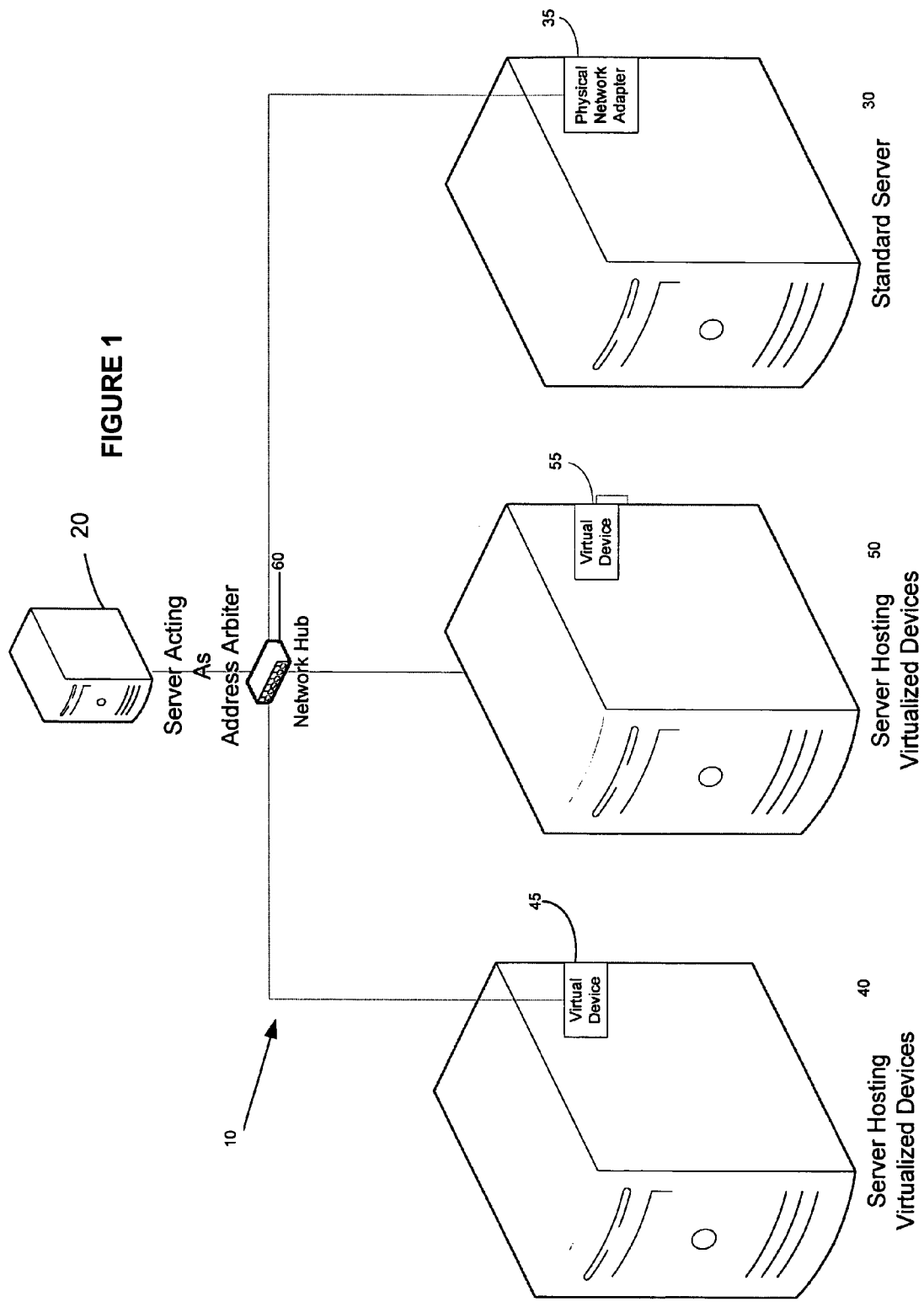
FIG. 1 illustrates a sample network topology in which a server acts as a MAC address allocator and arbiter.

Client (Device) and Server Embodiment (FIG. 1)

FIG. 1 illustrates a sample network topology 10 in which a server 20 acts as a MAC address allocator and arbiter in accordance with a first embodiment. In this embodiment, the MAC address allocation is handled at layer 2 of 7 in the OSI model in the communications between the server 20 and network devices connected within the network topology 10. A simplified network topology is illustrated including a standard server 30 having a physical network adapter 35, a server 40 hosting virtualized devices 45 that communicate directly with the server 20, and a server 50 hosting virtualized devices that communicate indirectly with the server 20 via an agent application within the server 50. Those skilled in the art will appreciate that physical network adapter 35 and virtual device 45 may communicate directly with server 20 using the protocol described herein to request a new MAC address, while server 50 acts as an agent for virtual device 55 to request a new MAC address from the server using the protocol described herein and to provide the new MAC address to the virtual device 55. Network hub provides a communications pathway through which servers 30, 40 and 50 may communicate with each other as well as the MAC address allocator and arbiter application of server 20. Those skilled in the art that many other conventional network devices may be present in the network topology 10 and that such devices may or may not use the techniques of the invention for assigning and arbitrating among MAC addresses.

In the embodiment of FIG. 1, an actual physical or virtual device added to the network using the protocols of the invention does not have a pre-assigned MAC address. As a result, the device has no network identity. Since the device has no network identity, it must communicate with server 20 (or any other device) using anonymous methods. In accordance with the invention, this is accomplished by having the client or device, when it is powered on or instantiated, send a broadcast Ethernet packet with a broadcast source address of FF:FF:FF:FF:FF:FF and a payload that is a request for a unique MAC address. In order to receive this packet and its payload including a request for a unique MAC address, server 20 must be on the same collision domain or have broadcast forwarding configured on the domain boundary so that server 20 may find an available MAC address in its assigned scope of addresses. Upon receipt of the packet, server 20 would mark a selected MAC address of the available MAC addresses as pending and respond with a broadcast packet using the source address of server 20 and having a payload including the selected MAC address as the selected MAC address for use by the client or device. When the device receives this MAC address, it sends a packet using the assigned MAC address to the server 20 indicating the device's acceptance of the new MAC address. The server 20 would then change the status of this MAC address from "pending" to "in use." This technique may be used by standard server 30, virtual device 45, and/or server 50.

At some later time when the device no longer needs the assigned MAC address (e.g., at power down or destruction), the final communication on the network is a directed message from the device informing the server 20 and all interested clients in the network 10 that the MAC address for that device is no longer in use. Upon receipt of this directed message, the server 20 marks the relinquished MAC address as available for reuse by another device in the future.

These features of the invention are more particularly described by way of the state machine diagrams of FIGS. 2-8.

Figure 2:
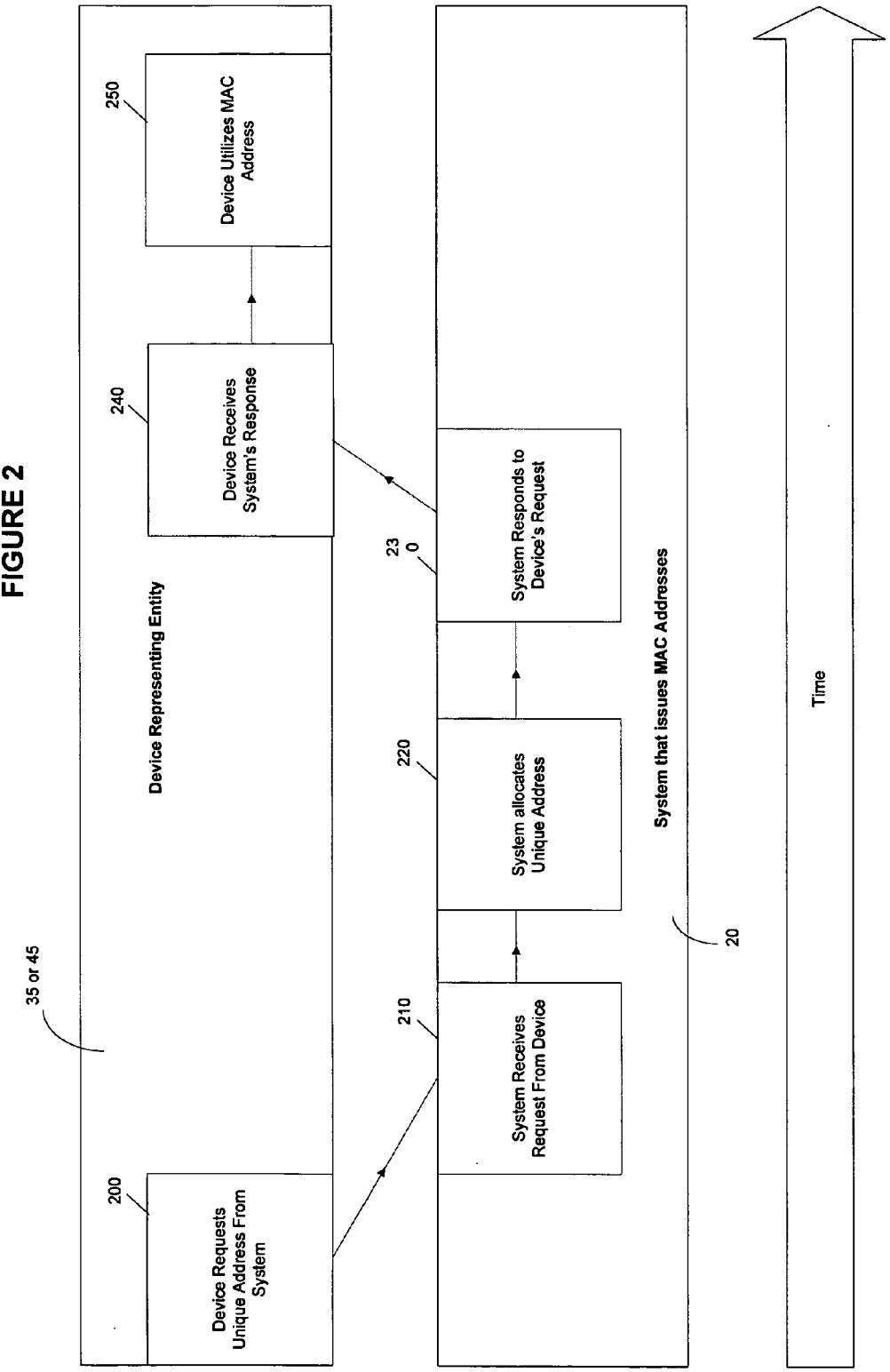
FIG. 2 illustrates state machines for the device and the MAC address allocation and arbitration system for the embodiment of FIG. 1 in which a virtual or physical device requests the allocation of a unique MAC address.

FIG. 2 illustrates state machines for the device and the MAC address allocation and arbitration system for the embodiment of FIG. 1 in which a virtual or physical device requests the allocation of a unique MAC address. As illustrated, the device (which may be a physical device such as physical network adapter 35 or a virtual device such as virtual device 45) requests a unique MAC address from the server 20 at step 200. As noted above, this request may be in the form of a broadcast Ethernet packet with a broadcast source address of FF:FF:FF:FF:FF:FF and a payload that is a request for a unique MAC address. At step 210, the server 20 receives the broadcast request from device 35 or 45 and allocates a unique MAC address at step 220. The server 20 then responds to the MAC address request at step 230 by providing the allocated MAC address to the device 35 or 45 by responding to the address with a broadcast packet with the broadcast source address of FF:FF:FF:FF:FF:FF. At step 240, the device 35 or 45 receives the response containing the allocated MAC address and utilizes the allocated MAC address at step 250.

Figure 3:
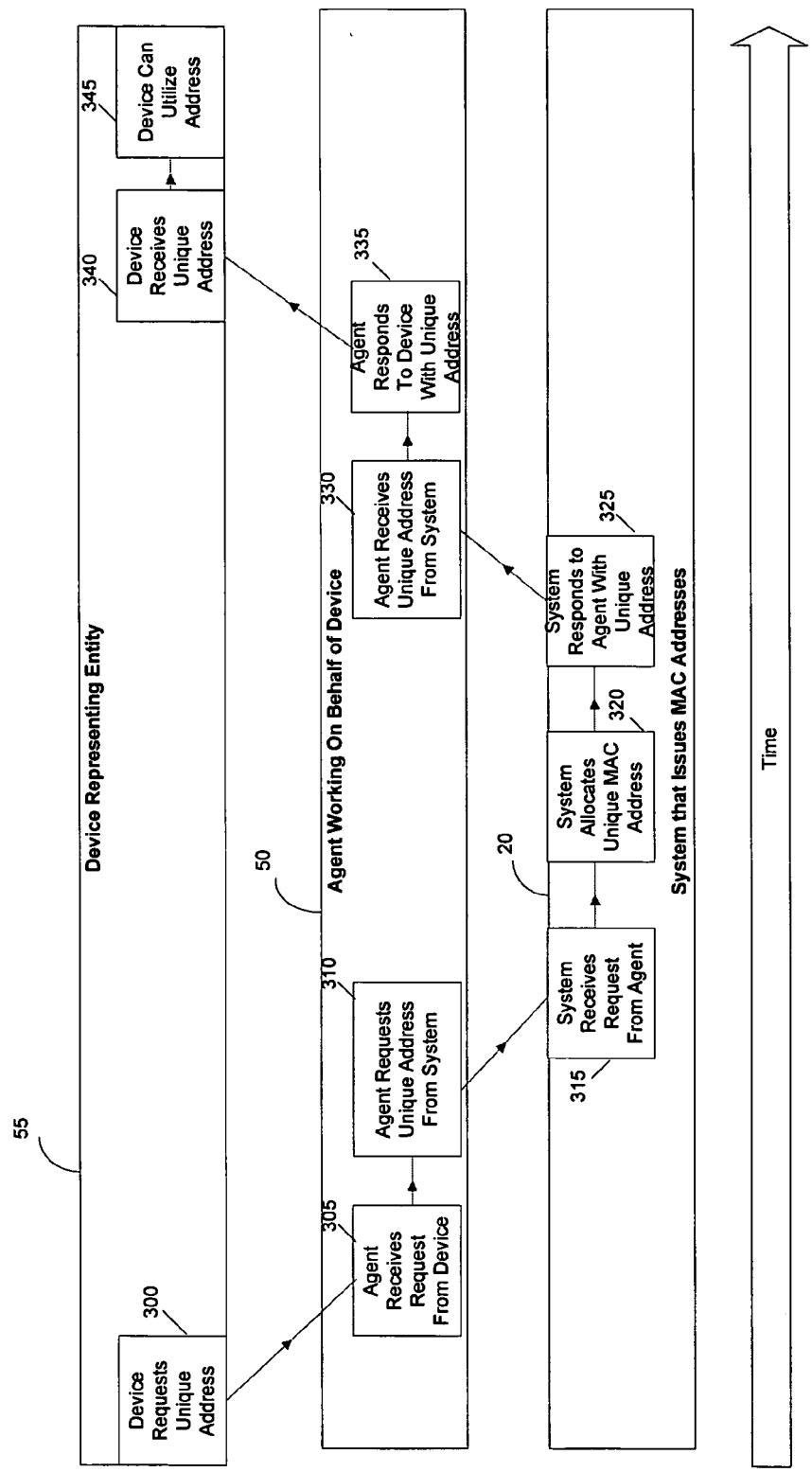
FIG. 3 illustrates state machines for the device, MAC address allocation and arbitration system, and agent for the embodiment of FIG. 1 where an agent works on behalf of the device to request the allocation of a unique MAC address.

FIG. 3 illustrates the protocol that will be used most often with virtual machines. In this embodiment, something that has network connectivity (such as server 50) creates and instantiates the network device 55 and can reallocate the MAC address from the server 20 at instantiation. Thus, when a new network device is requested or required, the hosting client (e.g., server 50, which already has a network address) sends a request to server 20 requesting a new MAC address for a new device 55. The server 20 allocates a new MAC address from its assigned scope and marks the address as pending and responds to the request with the new MAC address. The agent 50 then responds to the server 20 accepting the new MAC address and uses the new MAC address when creating the device 55. The device 55 can now communicate on the network 10. When the device 55 is de-instantiated (destructed) the agent 50 is responsible for informing the server 20 that the allocated MAC address is no longer needed. The server 20 then marks the address as available for subsequent reuse.

FIG. 3 illustrates state machines for the device, MAC address allocation and arbitration system, and agent for the embodiment of FIG. 1 where an agent works on behalf of the device to request the allocation of a unique MAC address. As illustrated, the device (e.g., virtual device 55) requests a unique MAC address from the server 20 at step 300. This request is intercepted by an agent within server 50 working on behalf of the device 55. Such an agent may be, for example, an I/O routine of the host server 50. This agent 50 receives the request at step 305 and requests a unique address from the server 20 at step 310. This request may be in the form of a conventional Ethernet packet since the source address of the agent 50 is known. At step 315, the server 20 receives the request from the agent 50 and allocates a unique MAC address at step 320. The server 20 then responds to the MAC address request at step 325 by providing the allocated MAC address to the agent 50 at its source address. At step 330, the agent 50 receives the unique MAC address from the server 20 and responds to the device 55 at step 335 to provide the allocated MAC address. At step 340, the device 55 receives the response containing the allocated MAC address and utilizes the allocated MAC address at step 345.

Figure 4:
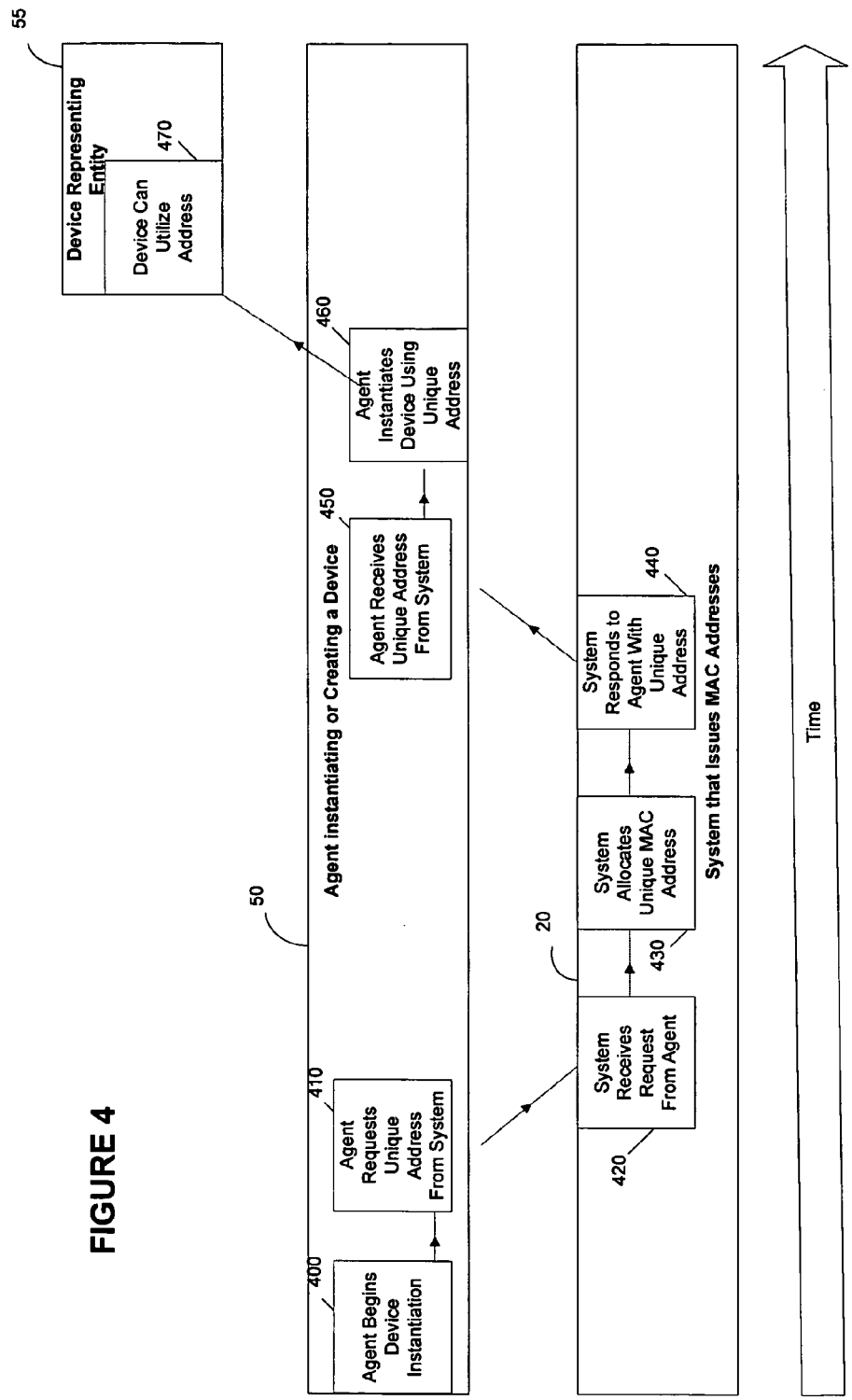
FIG. 4 illustrates state machines for the MAC address allocation and arbitration system and an agent as in the embodiment of FIG. 3 where the agent instantiates or creates a device having a unique MAC address.

FIG. 4 illustrates state machines for the MAC address allocation and arbitration system and an agent as in the embodiment of FIG. 3 where the agent instantiates or creates a device having a unique MAC address. In this embodiment, the agent (e.g., routine within server 50) begins device instantiation at step 400 and at step 410 requests a unique MAC address from server 20 for the instantiated device. This request may be in the form of a conventional Ethernet packet since the source address of the agent 50 is known. At step 420, the server 20 receives the request from the agent 50 and allocates a unique MAC address at step 430. The server 20 then responds to the MAC address request at step 440 by providing the allocated MAC address to the agent 50 at its source address. At step 450, the agent 50 receives the unique MAC address from the server 20 and instantiates the device at step 460 using the unique MAC address. The instantiated device 55 may then utilize the allocated MAC address at step 470.

Figure 5:
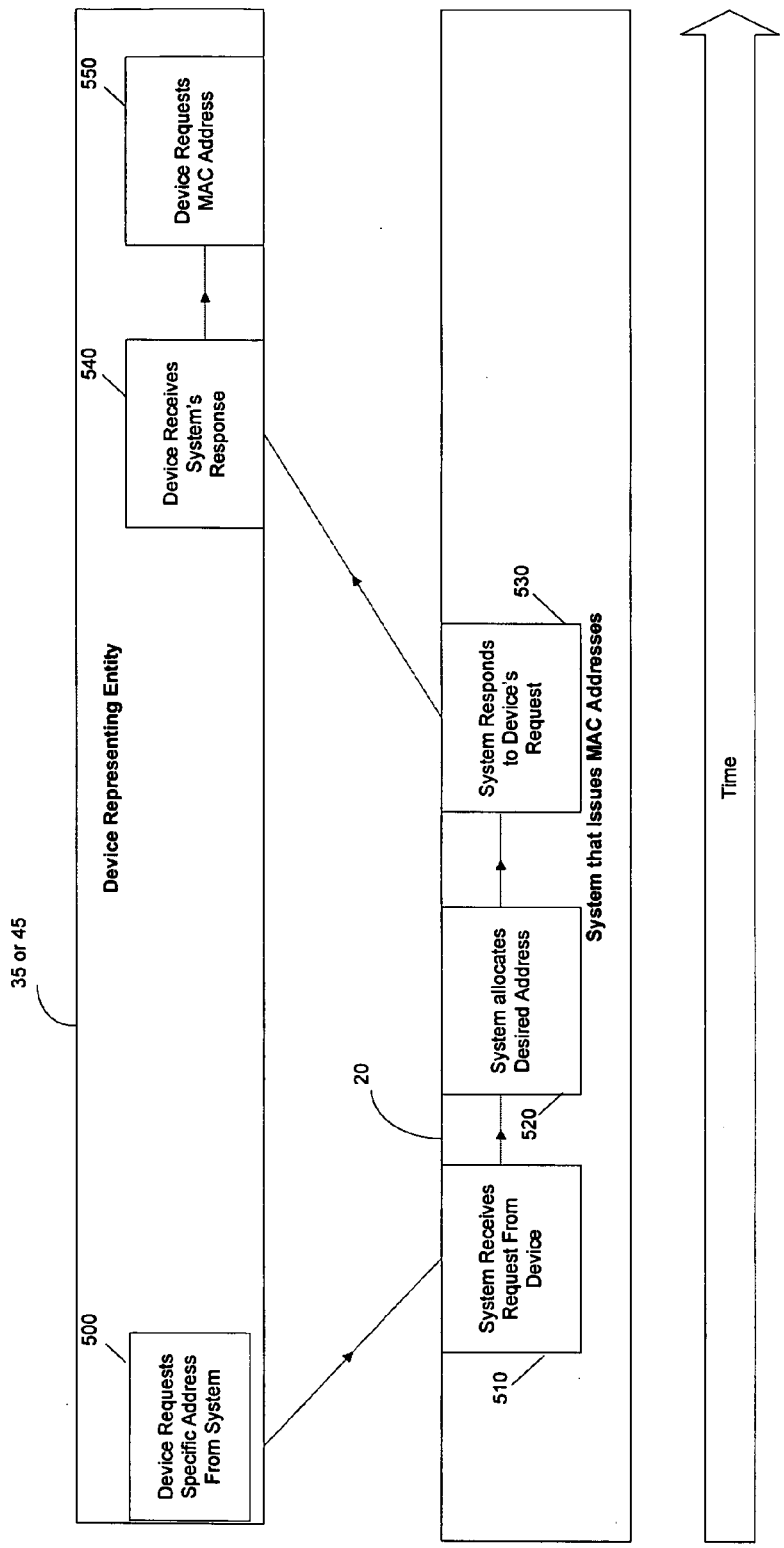
FIG. 5 illustrates state machines for the device and the MAC address allocation and arbitration system for an embodiment such as that in FIG. 1 but in which the device requests the allocation of a specific MAC address, if available.

Rather than requesting any unique address from the server 20, a device may request a specific MAC address from the server 20, if such specific MAC address is available, For example, FIG. 5 illustrates state machines for the device and the MAC address allocation and arbitration system for an embodiment such as that in FIG. 1 but in which the device requests the allocation of a specific MAC address, if available. As illustrated, the device (which may be a physical device such as physical network adapter 35 or a virtual device such as virtual device 45) requests a specific MAC address from the server 20 at step 500. As noted above, this request may be in the form of a broadcast Ethernet packet with a broadcast source address of FF:FF:FF:FF:FF:FF and a payload that is a request for the specific MAC address. At step 510, the server 20 receives the broadcast request from device 35 or 45 and, if the requested address is available, allocates the requested MAC address at step 520. The server 20 then responds to the MAC address request at step 530 by providing the requested MAC address to the device 35 or 45 using the broadcast source address of FF:FF:FF:FF:FF:FF. At step 540, the device 35 or 45 receives the response containing the requested MAC address and utilizes the requested MAC address at step 550.

Figure 6:
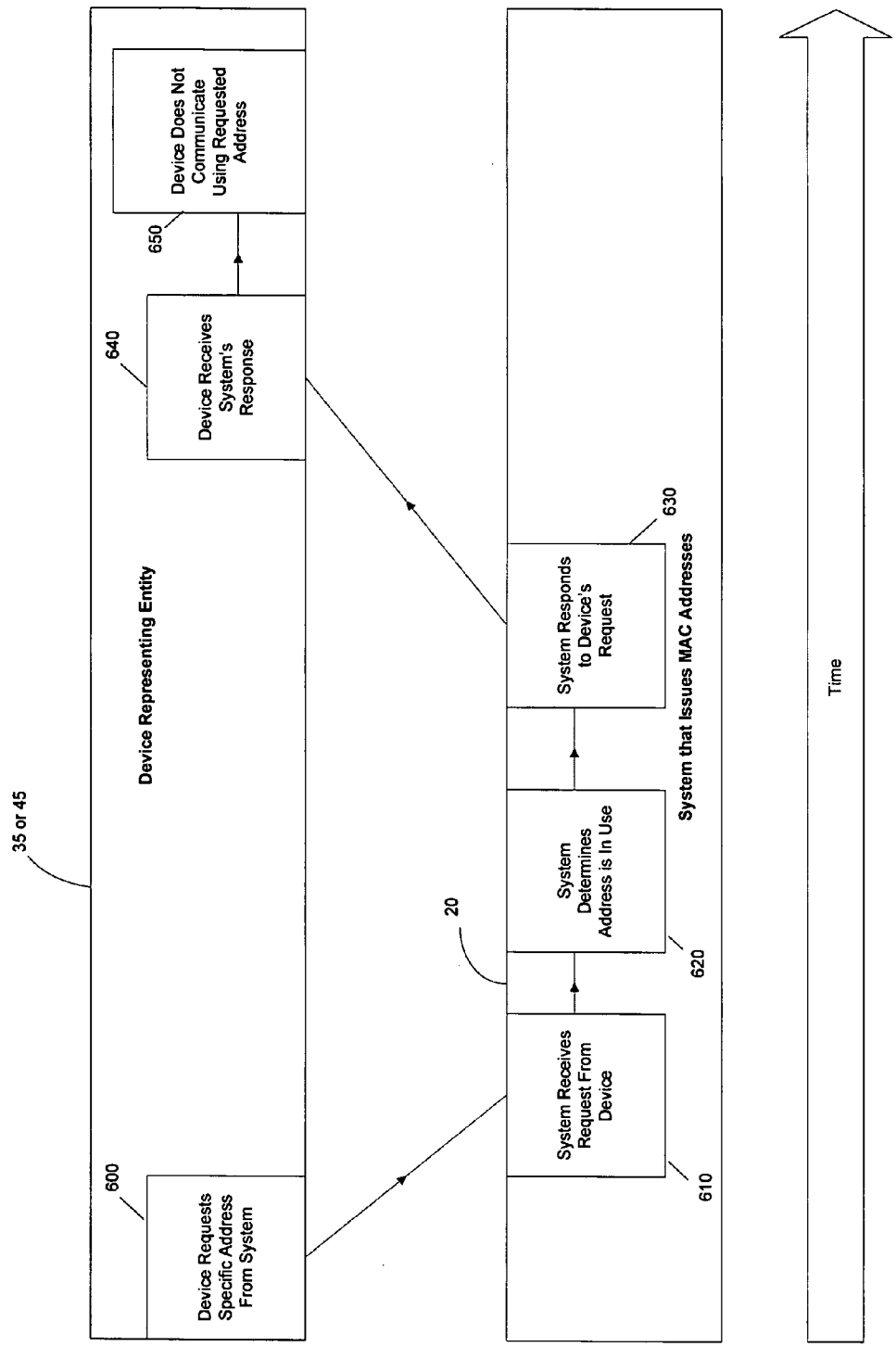
FIG. 6 illustrates state machines for the device and the MAC address allocation and arbitration system for an embodiment such as that in FIG. 1 but in which the device requests the allocation of a specific MAC address and the requested specific MAC address is not available.

FIG. 6 illustrates state machines for the device and the MAC address allocation and arbitration system for an embodiment such as that in FIG. 1 but in which the device requests the allocation of a specific MAC address and the requested specific MAC address is not available. As in FIG. 5, the device 35 or 45 requests a specific MAC address from the server 20 at step 600. This request may be in the form of a broadcast Ethernet packet with a broadcast source address of FF:FF:FF:FF:FF:FF and a payload that is a request for the specific MAC address. At step 610, the server 20 receives the broadcast request from device 35 or 45 and determines at step 620 that the requested address is in use. The server 20 then responds to the MAC address request at step 630 by notifying the device 35 or 45 using the broadcast source address of FF:FF:FF:FF:FF:FF that the requested address is in use. At step 640, the device 35 or 45 receives the response indicating that the requested address is in use and is thus unable to communicate at step 550. If desired the process may be repeated for a new requested address until a requested address is free to use.

Figure 7:
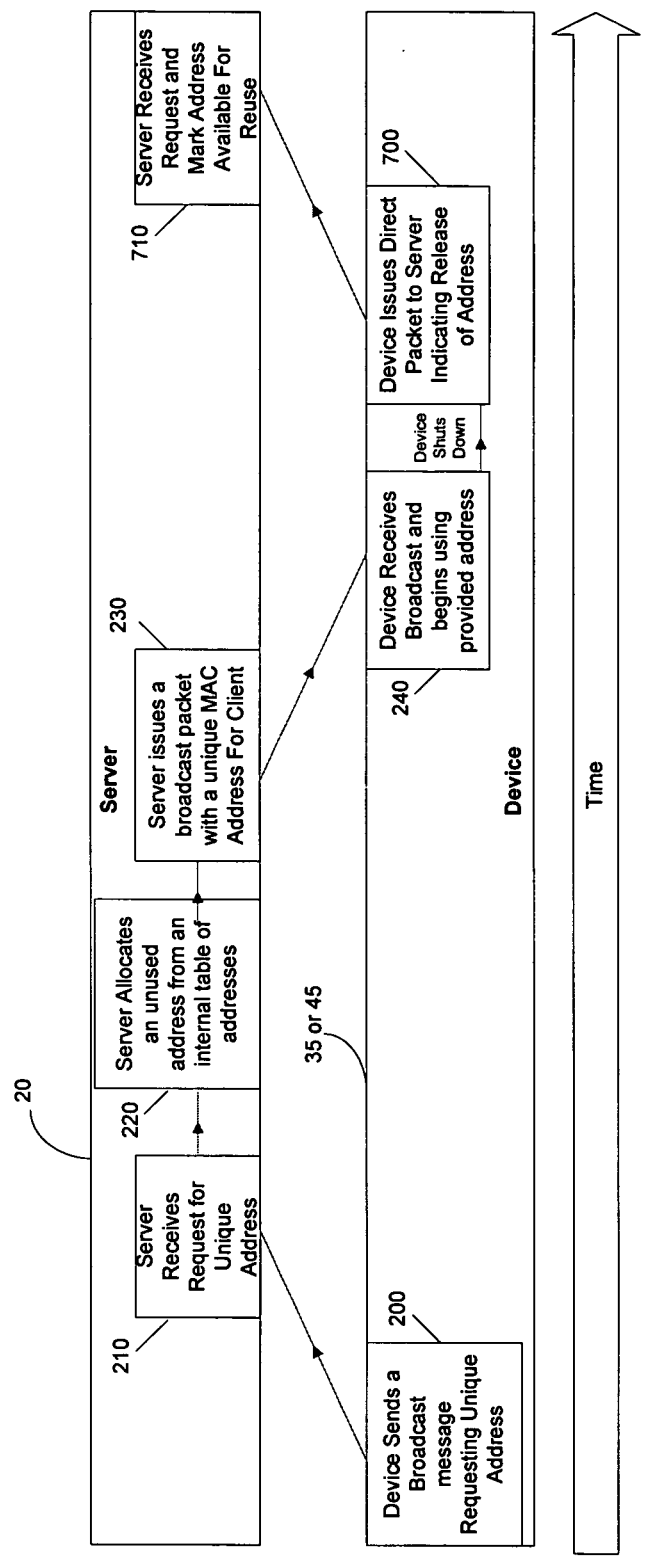
FIG. 7 illustrates state machines for an embodiment in which a device relinquishes a MAC address for reuse by the MAC address allocation and arbitration system of FIG. 1.

The system and method of the invention also provides a protocol for the devices to relinquish MAC addresses that are no longer in use. For example, FIG. 7 illustrates state machines for an embodiment in which a device relinquishes a MAC address for reuse by the MAC address allocation and arbitration system of FIG. 1. In this embodiment, the device 35 or 45 and server 20 follow the protocol of FIG. 2 (e.g., steps 200-240) to establish a unique address for the device 35 or 45. Once the device 35 or 45 is ready to shut down and/or to relinquish the allocated MAC address, the device 35 or 45 issues a direct packet to the server 20 at step 700 indicating that the MAC address being used by the device 35 or 45 is being released. Server 20 receives this packet at step 710 and marks the address as available for reuse in response to a subsequent MAC address request by the same or different device on the network 10.

Figure 8:
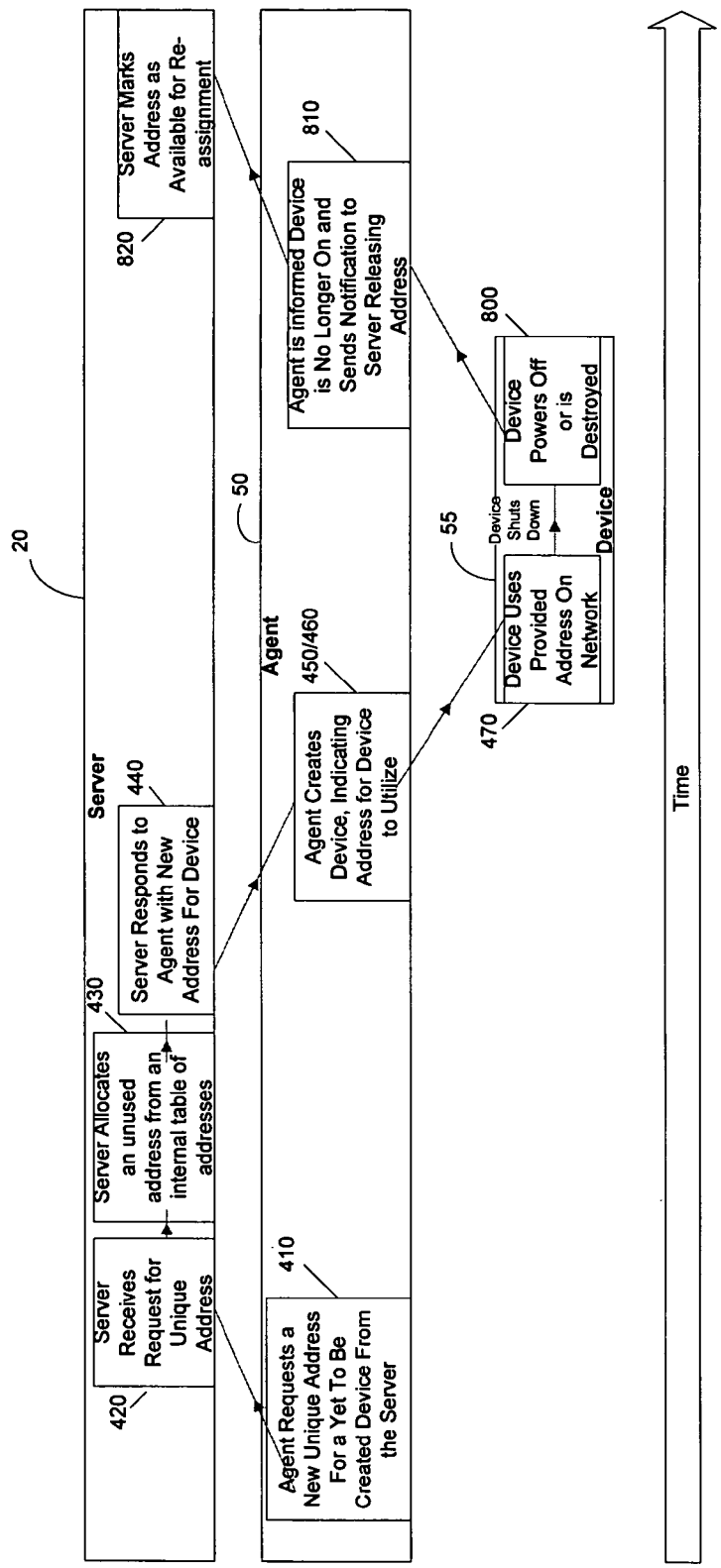
FIG. 8 illustrates state machines for an embodiment in which an agent acts on behalf of a device to relinquish a MAC address for reuse by the MAC address allocation and arbitration system of FIG. 1.

Similarly, FIG. 8 illustrates state machines for an embodiment in which an agent acts on behalf of a device to relinquish a MAC address for reuse by the MAC address allocation and arbitration system of FIG. 1. In this embodiment, the device 55 and server 20 follow the protocol of FIG. 4 (e.g., steps 410-470) to establish a unique address for the device 55. Once the device 55 is ready to shut down and/or to relinquish the allocated MAC address, the device 55 issues a direct packet to the server 20 at step 800 indicating that the MAC address being used by the device 55 is being released. Agent 50 receives this packet from device 55 at step 810 and informs the server 20 that the indicated MAC address is being relinquished. Server 20 receives this packet at step 820 and marks the address as available for reuse in response to a subsequent MAC address request by the same or different device on the network 10.

Figure 9:
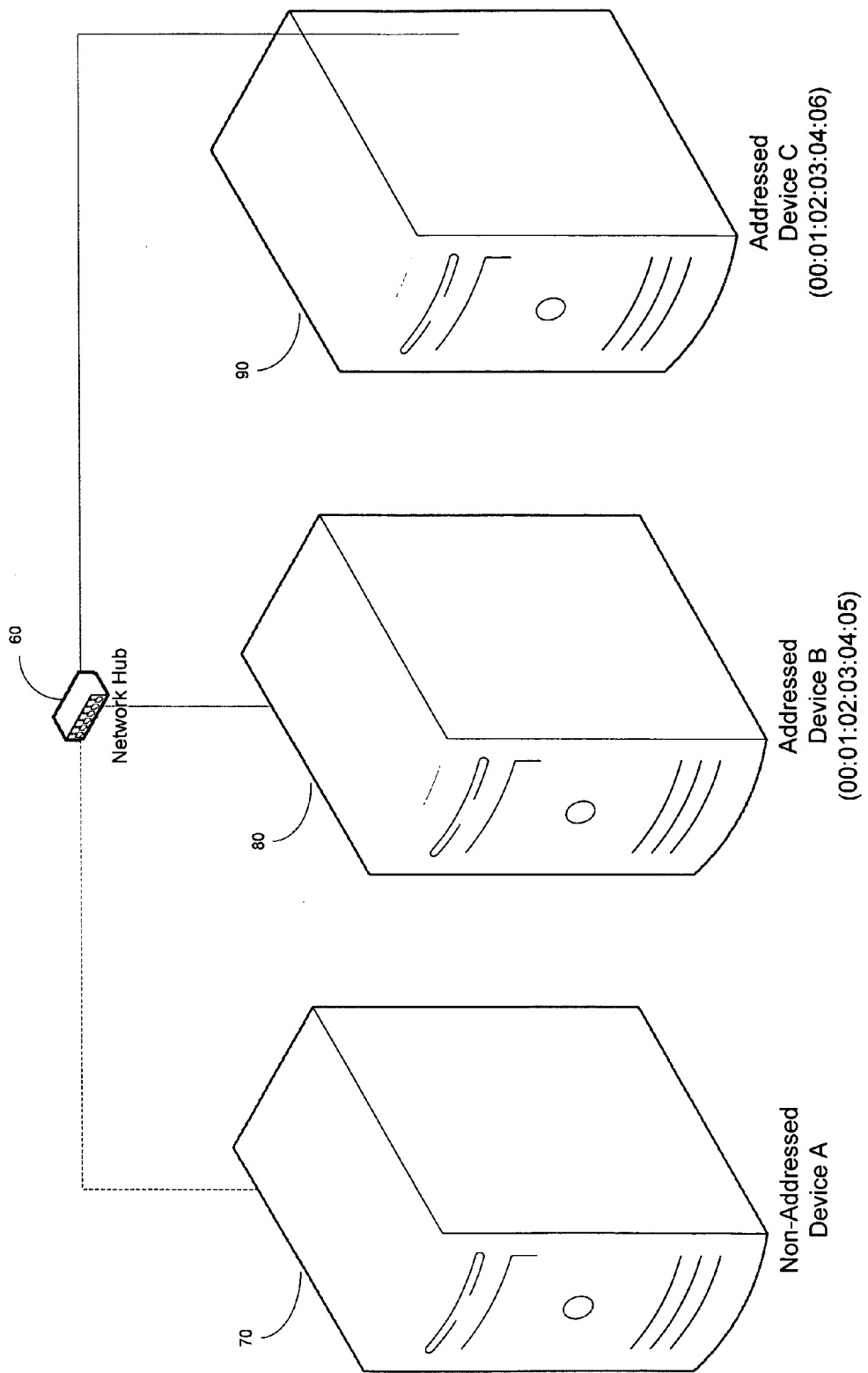
FIG. 9 illustrates a sample network topology of an alternative embodiment in which no server is used as a MAC address allocator and arbiter; instead, a device broadcasts a specific MAC address that it intends to use and allows a period of time for another device to indicate that the specific MAC address is already in use.

Several Clients but No Server Embodiment (FIG. 9)

FIG. 9 illustrates a sample network topology of an alternative embodiment in which no server is used as a MAC address allocator and arbiter; instead, a device broadcasts a specific MAC address that it intends to use and allows a period of time for another device to indicate that the specific MAC address is already in use. As illustrated in FIG. 9, the server 20 acting as a MAC address allocator and arbiter is no longer needed. In this embodiment, a new device A (70) that is to get a new MAC address is connected to other devices B (80) and C (90) that already have been assigned network MAC addresses 00:01:02:03:04:05 and 00:01:02:03:04:06, respectively. As in the embodiment of FIG. 1, device 70 initially has no identity so it must communicate with other devices on the network using anonymous methods. For example, when the client or device 70 is powered on or instantiated it sends a broadcast Ethernet packet with a broadcast source address of FF:FF:FF:FF:FF:FF and a payload including a statement of intent to use a specific MAC address. Other clients or devices on the network (e.g., 80 and 90) are responsible for listening to these broadcasts and, if the receiving client or device is currently using the requested MAC address or is reserving the requested MAC address, then the client or device 80 or 90 issues a broadcast packet using the source address of the first device's intended address and a payload that indicates an assertion of use. For example, if device A (70) sends out a broadcast packet indicating its intent to use the MAC address 00:01:02:03:04:05, device B (80) will issue a broadcast packet to device A at the broadcast source address FF:FF:FF:FF:FF:FF indicating that the requested MAC address is being used. If this occurs, the new client or device 70 selects a new MAC address and re-issues the statement in another broadcast packet containing a new requested MAC address. The process is then repeated. For example, device A (70) may send out a broadcast packet indicating its intent to use the MAC address 00:01:02:03:04:07. Since that address is available, no responses or assertions of use will be received within a predetermined time frame and this MAC address may be adopted. The client or device 70 then issues a broadcast packet with the source address 00:01:02:03:04:07 so as to inform other devices or clients of the use by the new client or device 70 of this new MAC address.

Figure 10:
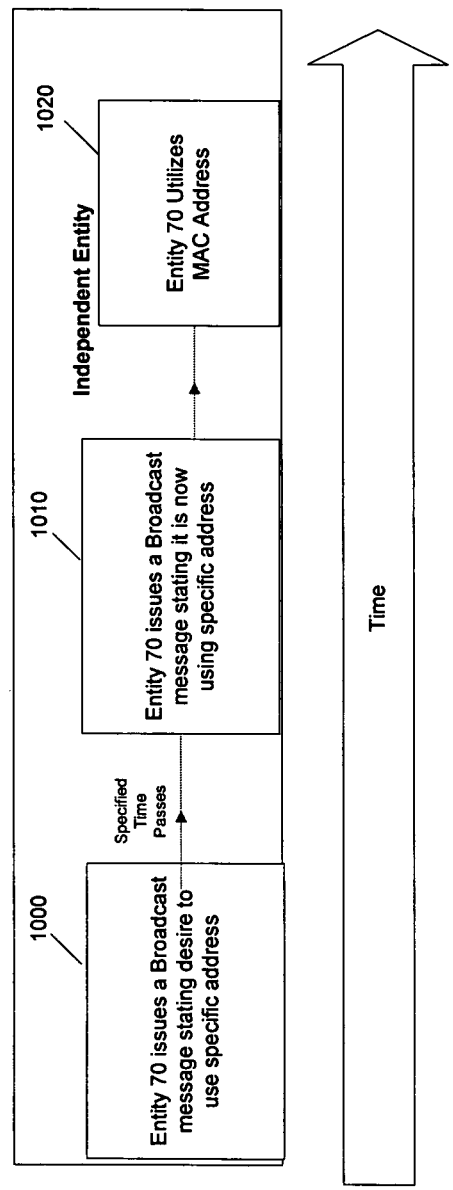
FIG. 10 illustrates a state machine of a device for the embodiment of FIG. 9 where the device may request a specific MAC address and obtain same in the absence of a MAC address allocation and arbitration system if the specific MAC address is not in use by another device on the network.

FIG. 10 illustrates a state machine of a device for the embodiment of FIG. 9 where the device may request a specific MAC address and obtain same in the absence of a MAC address allocation and arbitration system if the specific MAC address is not in use by another device on the network. As shown, an entity (e.g., device or client 70) issues a broadcast message stating a desire to use a specific MAC address at step 1000. After a specified period of time in which no response is received indicating that the requested MAC address is already in use, the entity issues at step 1010 another broadcast packet indicating to other devices on the network that entity 70 will now use the specific MAC address included in the broadcast packet. The entity 70 then uses the specific MAC address at step 1020.

Figure 11:
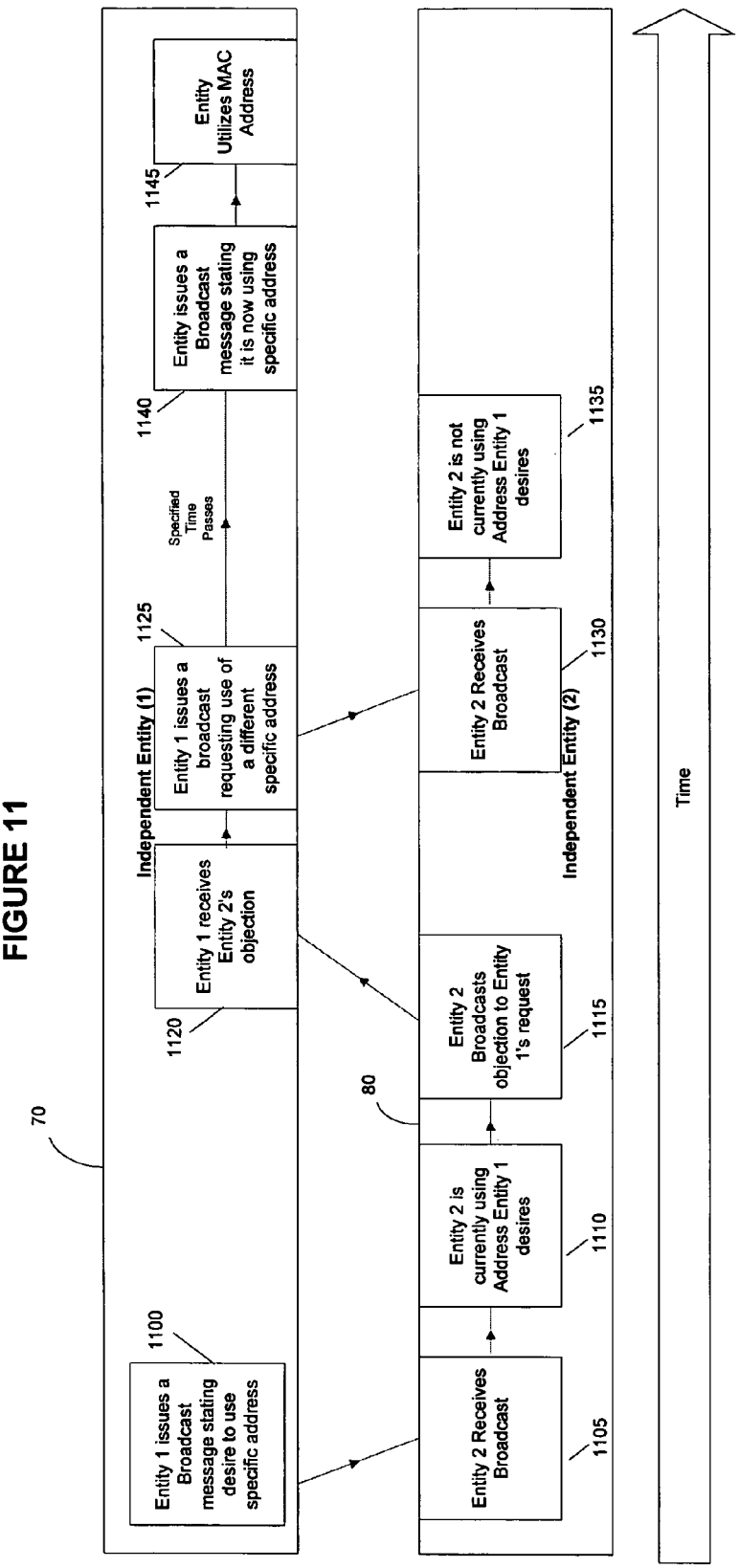
FIG. 11 illustrates state machines for respective devices for the embodiment of FIG. 9 in which a first device requests the allocation of a specific MAC address and the second device is not using the requested specific MAC address.

The process of FIG. 10 is shown in more detail in FIG. 11. FIG. 11 illustrates state machines for respective devices for the embodiment of FIG. 9 in which a first device requests the allocation of a specific MAC address and the second device is not using the requested specific MAC address. As shown, network entity 1 (e.g., device or client 70) issues a broadcast message stating a desire to use a specific MAC address at step 1100. Network entity 2 (e.g., device or client 80) receives the broadcast message at step 1105 and determines at step 1110 that it is currently using the MAC address that network entity 1 desires. At step 1115, network entity 2 broadcasts its objection to the request by entity 1 to use the desired MAC address. Network entity 1 receives the objection by network entity 2 at step 1120 (within the specified period of time) and, since the desired MAC address is unavailable, selects another specific MAC address for broadcast at step 1125. Network entity 2 receives the new broadcast message at step 1130 and determines at step 1135 that it is not currently using the MAC address that network entity 1 desires. Network entity 2 does nothing further and waits for the next broadcast message. After the specified period of time in which no response is received indicating that the requested MAC address is already in use, network entity 1 issues at step 1140 another broadcast packet indicating to other devices on the network that network entity 1 will now use the specific MAC address included in the second broadcast packet. Network entity 1 then uses the specific MAC address at step 1145 for future communications.

Those skilled in the art will appreciate that the techniques and protocols described herein will permit dynamically addressable physical devices and synthetic network devices such as those found in virtual machines to readily acquire and relinquish new MAC addresses without causing network addressing conflicts. Those skilled in the art will also appreciate that the address allocation techniques used by the devices and/or the address allocation and arbiter server 20 may be varied and are outside the scope of this invention.

Exemplary Networked and Distributed Environments

Although an exemplary embodiment of the invention may be implemented in connection with a network architecture including virtual machines (VMs) and/or other conventional synthetic and non-synthetic dynamic addressing network devices above, one of ordinary skill in the art will appreciate that the invention can be implemented in connection with any suitable host computer or other client or server device, which can be deployed as part of a computer network, or in a distributed computing environment. In this regard, the invention pertains to any computer system or environment having any number of memory or storage units, and any number of applications and processes occurring across any number of storage units or volumes, which may be used in connection with virtualizing a guest OS. The invention may apply to an environment with server computers and client computers deployed in a network environment or distributed computing environment, having remote or local storage. The invention may also be applied to standalone computing devices, having programming language functionality, interpretation and execution capabilities for generating, receiving and transmitting information in connection with remote or local services.

As known to those skilled in the art, distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 12:
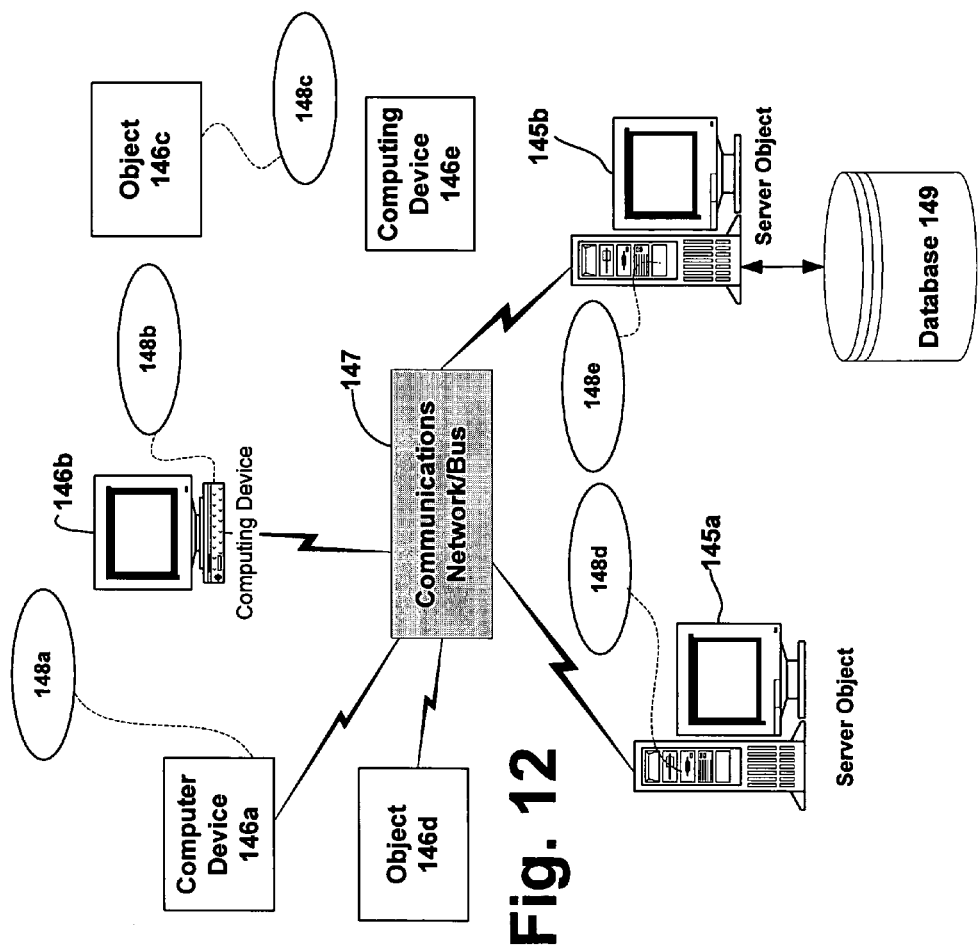
FIG. 12 illustrates a block diagram representing an exemplary network environment having a variety of computing devices in which the present invention may be implemented.

FIG. 12 provides a schematic diagram of an exemplary networked or distributed computing environment. The distributed computing environment comprises computing objects 145a, 145b, etc. and computing objects or devices 146a, 146b, 146c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 147. This network may itself comprise other computing objects and computing devices that provide services to the system of FIG. 12, and may itself represent multiple interconnected networks. In accordance with an aspect of the invention, each object 145a, 145b, etc. or 146a, 146b, 146c, etc. may contain an application that might make use of an API, or other object, software, firmware and/or hardware, to request use of the processes of the invention.

It can also be appreciated that an object, such as 146c, may be hosted on another computing device 145a, 145b, etc. or 146a, 146b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support such distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the processes of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the protocols in accordance with the invention.

As known to those skilled in the art, the Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such widespread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 12, computers 146a, 146b, etc. can be thought of as clients and computers 145a, 145b, etc. can be thought of as the server where server 145a, 145b, etc. maintains the data that is then replicated in the client computers 146a, 146b, etc., although any computer can be considered a client, a server, or both, depending on the circumstances. Any of these computing devices may be processing data or requesting services or tasks that may implicate an implementation of the processes of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of any virtualized architecture(s) may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 12 illustrates an exemplary networked or distributed environment, with a server in communication with client computers via a network/bus, in which the invention may be employed. In more detail, a number of servers 145a, 145b, etc., are interconnected via a communications network/bus 147, which may be a LAN, WAN, intranet, the Internet, etc., with a number of client or remote computing devices 146a, 146b, 146c, 146d, 146e, etc., such as a portable computer, handheld computer, thin client, networked appliance, or other device, such as a VCR, TV, oven, light, heater and the like. It is thus contemplated that the invention may apply to any computing device in connection with which it is desirable to acquire a MAC address for network communications in accordance with the invention.

In a network environment in which the communications network/bus 147 is the Internet, for example, the servers 145*a*, 145*b*, etc. can be Web servers with which the clients 146*a*, 146*b*, 146*c*, 146*d*, 146*e*, etc. communicate via any of a number of known protocols such as HTTP. Servers 145*a*, 145*b*, etc. may also serve as clients 146*a*, 146*b*, 146*c*, 146*d*, 146*e*, etc., as may be characteristic of a distributed computing environment.

Communications may be wired or wireless, where appropriate. Client devices 146*a*, 146*b*, 146*c*, 146*d*, 146*e*, etc. may or may not communicate via communications network/bus 147, and may have independent communications associated therewith. For example, in the case of a TV or VCR, there may or may not be a networked aspect to the control thereof. Each client computer 146*a*, 146*b*, 146*c*, 146*d*, 146*e*, etc. and server computer 145*a*, 145*b*, etc. may be equipped with various application program modules or objects 148 and with connections or access to various types of storage elements or objects, across which files or data streams may be stored or to which portion(s) of files or data streams may be downloaded, transmitted or migrated. Any one or more of computers 145*a*, 145*b*, 146*a*, 146*b*, etc. may be responsible for the maintenance and updating of a database 149 or other storage element, such as a database or memory 149 for storing data processed according to the invention. Thus, the invention can be utilized in a computer network environment having client computers 146*a*, 146*b*, etc. that can access and interact with a computer network/bus 147 and server computers 145*a*, 145*b*, etc. that may interact with client computers 146*a*, 146*b*, etc. and other like devices, and databases 149.

Exemplary Computing Device

Figure 13:
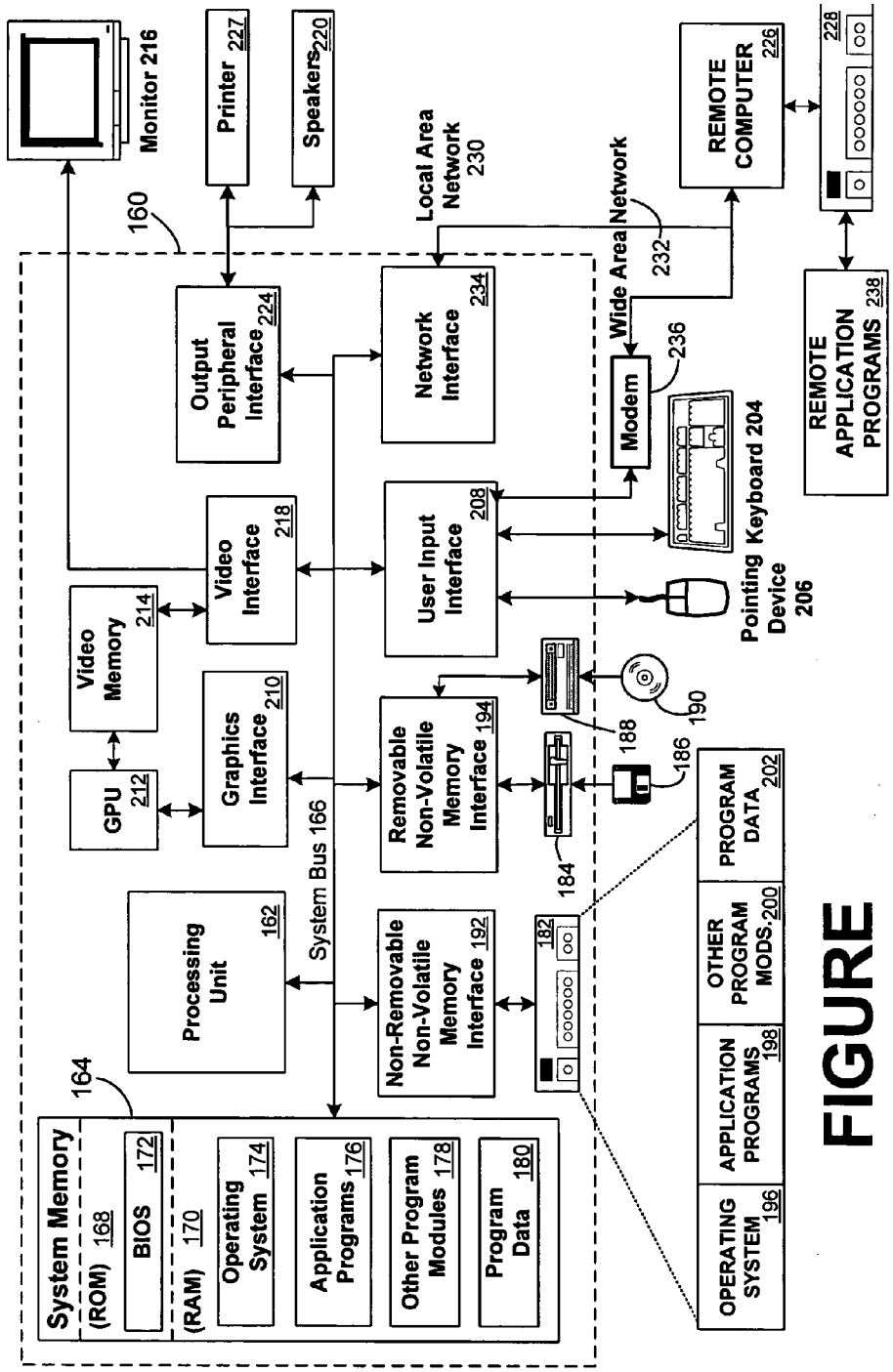
FIG. 13 illustrates a block diagram representing an exemplary computing device in which the present invention may be implemented.

FIG. 13 and the following discussion are intended to provide a brief general description of a suitable host computing environment in connection with which the devices of the invention (particularly any virtualized devices) may be implemented. It should be understood, however, that handheld, portable and other computing devices, portable and fixed gaming devices, and computing objects of all kinds are contemplated for use in connection with the invention. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques in accordance with the invention.

Although not required, the invention can be implemented in whole or in part via an operating system, for use by a developer of services for a device or object, and/or included within application software that operates in connection with any virtualized OS used for implementation of the invention. Software may be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 13 illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 13, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other computer readable medium that may be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. It is specifically contemplated that the protocols described herein are implemented in software in computer readable media that may be read by a computer processor for reconfiguration of the general purpose computer into a device or system for implementation of the invention described herein.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 13 illustrates operating system 174, application programs 176, other program modules 178, and program data 180.

The computer 160 may also include other removable/non-removable, volatile/nonvolatile computer storage media. By way of example only, FIG. 13 illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 13 provide storage of computer readable instructions, data structures, program modules and other data for the computer 160. In FIG. 13, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that may be virtualized by architectures that use the protocol of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 13. The logical connections depicted in FIG. 13 include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 13 illustrates remote application programs 238 as residing on memory device 228. It will be appreciated that the network connections shown are exemplary and other means of establishing a communications link between the computers may be used.

There are multiple ways of implementing the invention, e.g., an appropriate API, tool kit, driver code, operating system, control, standalone or downloadable software object, etc. which enables applications and services to use the architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the techniques of the invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described in the context of a networked environment, such as a peer to peer networked environment, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the invention in the context of a guest OS virtualized on a host OS, the invention is not so limited, but rather may be implemented in a standard computer as well as to virtualize a second specialized processing unit cooperating with a main processor for other reasons as well. Moreover, the invention contemplates the scenario wherein multiple instances of the same version or release of an OS are operating in separate virtual machines. It can be appreciated that the invention is independent of the operations for which the guest OS is used. It is also intended that the invention applies to all computer architectures, not just the Windows™ or Xbox™ architecture. Still further, the invention may be implemented in or across a plurality of processing chips or devices, and storage may similarly be effected across a plurality of devices. Therefore, the invention should not be limited to any single embodiment, but rather should be construed in breadth and scope in accordance with the appended claims.

What is claimed:

1. A network device for enabling communication over a network comprising:
a processor; and
a memory communicatively coupled to the processor when the network device is operational, the memory comprising computer instructions that upon execution by the processor, cause the network device to:
instantiate a virtual device that is indirectly connected to the network, the virtual device being instantiated on the network device;
intercept a request for a MAC address, the request being made from the virtual device to a server that allocates MAC addresses for the virtual device, the request being intercepted by an agent executing within the network device and not being part of the virtual device;
request the MAC address from the server, the request being made by the agent over the network by broadcasting said request for said MAC address and indicating a broadcast source address to which the server is to return an allocated MAC address;
receive the allocated MAC address from the server, the allocated MAC address being received by the agent over the network; and
provide the allocated MAC address server to the virtual device, the allocated MAC address being provided from the agent to the virtual device within the network device.

2. The network device as in claim 1, wherein the requested MAC address is a predetermined MAC address that said server is requested to allocate to said virtual device as said unique MAC address if said predetermined MAC address is not already allocated.

3. The network device as in claim 1, wherein the memory comprises computer instructions that upon execution by the processor cause the network device to send a message to said server indicating that the allocated MAC address is being released by the network device.

4. The network device as in claim 1, wherein said virtual device is instantiated by said agent and said agent requests the unique MAC address as part of a process of instantiation of said virtual device.

5. The network device as in claim 4, wherein when the virtual device no longer needs its allocated MAC address the agent sends a message to said server indicating that the allocated MAC address is being released by the virtual device.

6. The network device of claim 1, wherein the agent is an input/output routine of the network device.

7. A device to enable communication with other devices on a network, comprising:
   a processor;
   a memory in electrical communication with the processor when the device is operational and having stored thereon computer-readable instructions that, upon execution by the processor, cause the device to:
      send a broadcast packet on behalf of a virtual device instantiated on the device without specifying the IP address of a server with a predetermined source address, where the broadcast source address is a fixed and anonymous source address and a payload indicating an intent to use a specific MAC address; and
      if a message is received from another network device within a predetermined period of time indicating that the specific MAC address is already allocated, select a different specific MAC address and send another broadcast packet having a payload indicating an intent to use the different specific MAC address;
      send a packet indicating that the specific MAC address is being allocated to the virtual device if no message is received within the predetermined period of time from another network device indicating that the specific MAC address is already allocated.

8. A method of enabling a virtual device to obtain a unique MAC address for use in communication with other devices on a network, comprising:
   beginning, by an agent executing on a network device, the instantiation of the virtual device on the network device;
   requesting, by the agent, a MAC address for the virtual device anonymously from a server that allocates MAC addresses to devices on the network, by
   broadcasting said request for MAC address and indicating a broadcast source address to which the server is to return an allocated MAC address;
   receiving, by the agent from the server, an allocated MAC address in response to the request;
   upon receipt of the allocated MAC address, completing the instantiation of the virtual device by the agent; and
   providing, by the agent, the MAC address to the virtual device for use by the virtual device in communication on the network.

9. A method as in claim 8, wherein the requesting step comprises the steps of broadcasting a request for a predetermined MAC address from said server and receiving the predetermined MAC address from said server if said predetermined MAC address is not already allocated.

10. A method as in claim 8, comprising the further step of sending a message to the server indicating that the allocated MAC address is being released by the virtual device.

11. A method as in claim 8, wherein the virtual device is indirectly connected to the network.

12. A method as in claim 8, comprising the further step of the agent sending a message to the server indicating that the allocated MAC address is being released by the virtual device when the virtual device no longer needs its allocated MAC address.

13. A method of enabling a virtual device to obtain a unique MAC address for use in communication with other devices on a network, comprising:
   sending a broadcast packet without specifying a valid destination address for the packet and with a predetermined source address where the source address is a fixed and anonymous source address and a payload indicating an intent to use a specific MAC address;
   if a message is received from another network device within a predetermined period of time indicating that the specific MAC address is already allocated, selecting a different specific MAC address and sending another broadcast packet having a payload indicating an intent to use the different specific MAC address; and
   if no message is received within a predetermined period of time from another network device indicating that the specific MAC address is already allocated, sending a broadcast packet indicating that the specific MAC address is being allocated and providing the MAC address to the virtual device instantiated on a virtual machine when needed for communication by the virtual machine on the network.

14. A computer readable storage device comprising computer-executable instructions that, upon execution on a computer, cause the computer to:
   send a broadcast packet without specifying a valid destination address and with a predetermined source address where the source address is a fixed and anonymous source address and a payload indicating an intent to use a specific MAC address;
   if a message is received from another network device within a predetermined period of time indicating that the specific MAC address is already allocated, select a different specific MAC address and send another broadcast packet having a payload indicating an intent to use the different specific MAC address; and
   if no message is received within a predetermined period of time from another network device indicating that the specific MAC address is already allocated, send a broadcast packet indicating that the specific MAC address is being allocated and provide the MAC address to a first virtual device that needs to communicate on the network.

15. The computer readable storage device as recited in claim 14 comprising computer-executable instructions that, upon execution on the computer, cause the computer to:
   obtain a second MAC address to for a second virtual device instantiated on the same computing device as the first virtual device.

* * * * *